Aug. 5, 1969 W. C. LEONE 3,460,115

MAGNETIC PIN INFORMATION STORAGE SYSTEM

Filed Aug. 16, 1965

INVENTOR.
WILLIAM C. LEONE
BY Christie, Parker & Hale
ATTORNEYS.

United States Patent Office 3,460,115
Patented Aug. 5, 1969

3,460,115
MAGNETIC PIN INFORMATION STORAGE SYSTEM

William C. Leone, Palos Verdes Estates, Calif., assignor to Ex-Cell-O Corporation, Detroit, Mich., a corporation of Michigan Filed Aug. 16, 1965, Ser. No. 479,908
Int. Cl. G11b 5/12
U.S. Cl. 340—174 3 Claims

ABSTRACT OF THE DISCLOSURE

A mechanical storage system for mechanically storing binary coded electrical signals. The storage system comprises a supporting structure having movable storage elements mounted thereon for storing a binary signal in accordance with the position of the element on the supporting structure. The system includes means for setting and resetting the elements between the binary positions and sensing means for producing binary coded electrical signals representative of the positions of the movable storage elements upon the production of relative movement between the supporting structure and the sensing means.

Figures 1, 2:
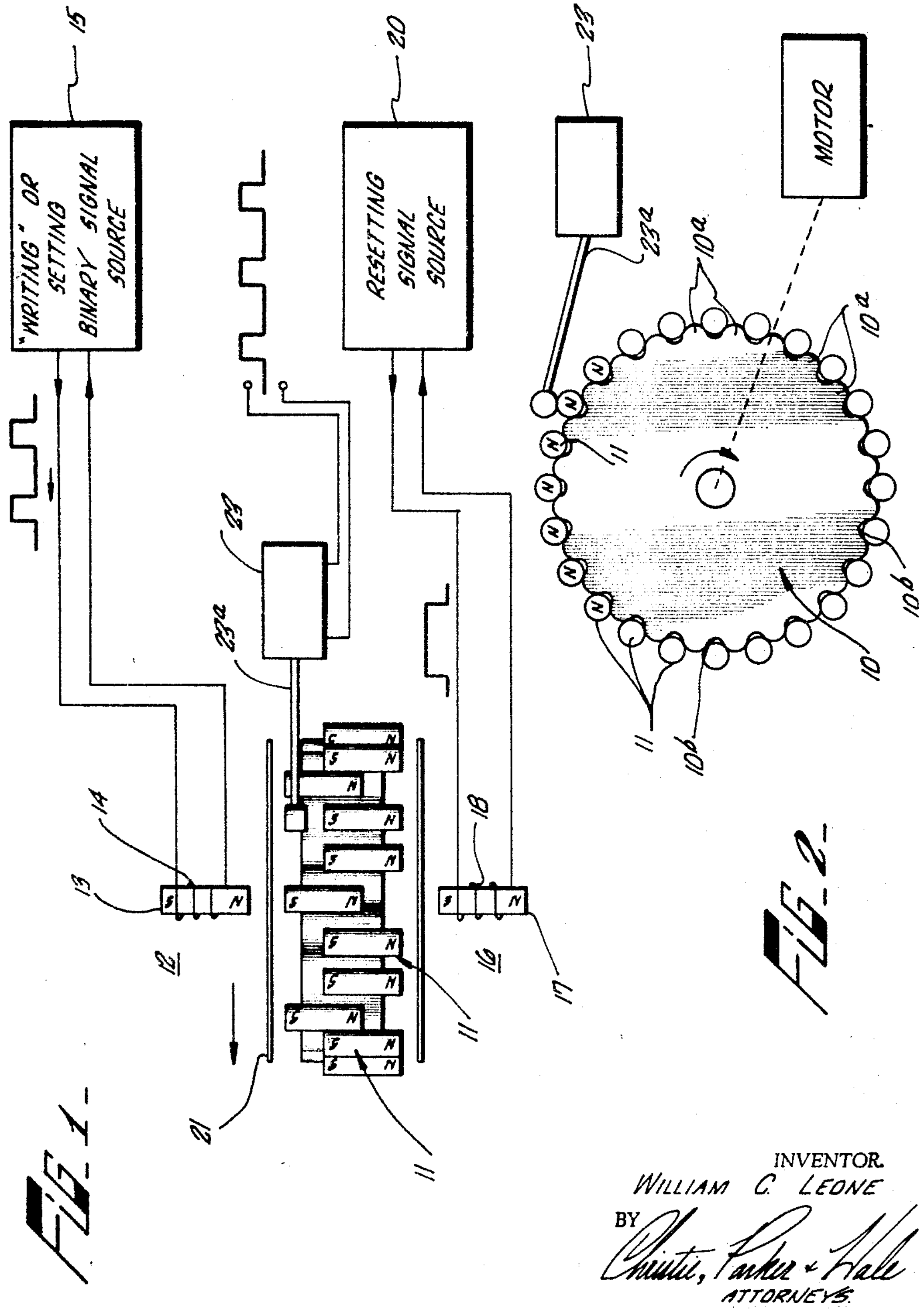

This invention relates to an information storage system and more particularly, mechanical apparatus for storing binray coded information.

With the development of the digital computing art, devices for storing binary coded information have been examined and developed in terms of various physical forms including magnetic, optical, electrical and in some instances mechanical devices. In general, most of these information systems have been developed in terms of high capacity storage systems for storing binary coded electrical signals and which high capacity storage systems that allow ready access to any storage location to read or write at that location. As a result, most present day information storage systems are complex and expensive devices. Furthermore, in general, most of the information storage systems that have been adopted for commercial use are electro-magnetic systems due to the high access speeds possible with electrical techniques. There are many requirements, however, for an economical device for storing information with a limited storage capacity that may be simply implemented. In the reading of information from a coded record member, for example, it is sometimes necessary to correlate the information read from the record member on a line by line basis and integrating this information into a signal representative of a series of lines or a particular block of information. This composite signal may then be the signal to be stored. Another example of the requirement for a simple information storage device is in the final testing phase of the production of various electronic components to determine their acceptability for shipping. In this production phase, the device may be subjected to a series of tests and the signal to be stored may be a "yes" or "no" signal for indicating the passing of all of the tests to which the device is subjected or the failing of one or more of such tests. Accordingly, at present there is a need for an economical storage system.

The present invention provides an improved, simple and relatively inexpensive mechanical device for storing binary coded information that can be readily constructed from inexpensive, commercially available components.

Structurally, the present invention utilizes a movable supporting structure for supporting movable storage elements whose position on the structure is representative of the binary character that is being stored. The supporting structure may be in the form of a rotatable gear having the usual gear teeth wherein a storage position is defined intermediate a pair of teeth. For coaction with such a gear wheel, the movable storage elements may be defined in terms of permanent magnets that are positioned on the gear wheel betwen a pair of teeth and movable between at least two positions thereon for storing binary coded information. The positions of the bar magnets on the gear wheel may be controlled by positioning means in the form of electromagnets that are responsive to a binary signal source for magnetically moving the magnets from one position to another on the gear wheel and thereby record the electrical signals received from the binary signal source. The gear wheel may be readily "read out" to derive, once again, the binary coded information in terms of electrical signals upon the production of relative movement between the gear wheel and a sensing device coacting with the gear wheel for sensing the position of the individual storage elements and providing electrical output indications corresponding thereto to provide a corresponding signal train of binary coded characters.

These and other features of the present invention may be more fully appreciated when considered in the light of the following specification and drawings in which:

FIG. 1 is a schematic diagram of the mechanical information storage system embodying the present invention; and FIG. 2 is a diagrammatic illustration of the readout means for the mechanical storage device of FIG. 1.

Now referring to FIG. 1, the mechanical storage system of the present invention will be described. The information storage device of the present invention comprises a supporting structure in the form of a rotatable gear wheel 10 mounting movable storage elements or bar magnets 11 betwen the teeth 10ᵃ of the gear. Specifically, the storage elements 10ᵃ are mounted betwen the lands 10ᵇ defined between an adjacent pair of gear teeth 10ᵃ and are retained thereon by their own magnetism and the fact that the gear wheel 10 is constructed of a material having magnetic properties. The bar magnets 10 have sufficient magnetism to be retained on the gear wheel 10 even with the complete rotation of the wheel.

The magnetic storage elements or bar magnets 11 are each initially positioned on the gear wheel 10 with their polarities oriented in the same direction for storing a binary character, for example, the binary character zero. To this end, the storage elements 11 are each normally oriented with the south magnetic pole positioned towards the top of the paper and the north pole towards the bottom. Some of the storage elements 11, as illustrated in FIG. 1, have been moved to the alternate binary position and thereby store the binary character one. This alternate position results from being operated on by the positioning means, to be described immediately hereinafter.

In order to store a binary one or to reset the storage elements 11 to its normal position for indicating a binary zero, means are provided for moving the storage elements magnetically between their two positions. For this purpose, a "writing" electromagnet 12 comprising a magnetizable core 13 and an energizable winding 14 coupled thereto is illustrated mounted adjacent the storage elements 11 for operating thereon. The energizable winding 14 is connected to a binary signal source 15 to be energized by the binary signals received therefrom for causing the storage elements 11 to be moved only in response to a binary "one." In the same fashion, the absence of a signal from the binary signal source 15 will maintain the winding 14 in a de-energized state and the storage elements 11 in their normal position. Any residual magnetism in the core 13 will also tend to hold the storage elements 11 in their normal state for representing a binary zero. A signal delivered from the signal source 15 indicative of a binary one will energize the winding 14 and create a magnetic flux within the core 13 to repel the adjacent storage element 11 and cause it to move away from the electromagnet 12 and assume its other binary position, in the fashion illustrated in FIG. 1. The polarity of this repelling force is illustrated in FIG. 1 as having its south magnetic pole towards the top of the paper and the north magnetic pole towards the bottom of the paper. It will, of course, be appreciated that the delivery of the binary signals from the source 15 must be in a timed relationship with the rotation of the gear wheel 10 so that the correct storage element 11 will be operated on and the read-out of the device will be meaningful. This can be simply accomplished through the selection of a drive means or motor 24 for the gear wheel 10 that has a speed related to the rate of delivery of the signals from the binary signal source 15.

Although, it will be appreciated by those skilled in the art that the resetting of the storage elements 11 to their binary zero position may be effected by reversing the polarity of the signals delivered to the winding 14 to create a magnetic field that attracts each of the storage elements 11 towards the electromagnet 12, it has been found more convenient to provide separate resetting means for the storage elements 11. To this end, a second electromagnet 16 having a magnetizable core 17 and an energizable winding 18 coupled thereto and connected to a resetting signal source 20 is provided. For this purpose, the resetting signal source may provide an electrical signal of the correct polarity to provide a magnetic field having a south pole adjacent the storage elements 11 to repel or move each of the elements towards the electromagnet 12 to assume their normal binary zero position. This resetting signal from the source 20 may have a time duration to erase all of the information stored in the storage elements 11 or for erasing the information represented by individual storage elements 11. When individual storage elements 11 are being reset or erased, again, it is necessary to provide a resetting signal from the source 20 in a timed relationship with the rotation of the gear wheel 10 to cause the correct storage element 11 to be erased.

It may also be found convenient to provide shields of non-magnetic material, similar to the shields 21 and 22, arranged adjacent opposite faces of the gear wheel 10 and between the gear wheel and the electromagnets 12 and 16. The shields 21 and 22 are utilized to prevent the loss in the magnetism of the permanent magnets functioning as the storage elements 11.

The further aspect of the present invention is the means for reading out the position of the individual storage elements 11 and providing a train of binary coded electrical signals corresponding to the positions assumed by the elements 11. For this purpose, a simple arrangement for reading out the positions of the storage elements 11 in accordance with the present invention comprises electro-mechanical switching means in the form of a conventional micro-switch 23 having an operating arm 23$^a$ mounted to extend into engagement with the peripheral edge of the gear wheel 10. For this purpose, the operating arm 23$^a$ is mounted to overlie the top edge of the gear wheel, as illustrated, to normally ride over the storage elements 11. In this position, the operating arm 23$^a$ will not actuate the switch 23 when each of the storage elements 11 represent a binary zero. The absence of an electrical signal generated by the switch 23, then, corresponds to the absence of a signal from the binary signal source 15 and the normal storage position of the elements 11. With the rotation of the gear wheel 10 and assuming that the storage elements 11 have been operated on to store binary ones, then, the positioning of the operating arm 23 at a "one" store will cause the arm 23$^a$ to drop into the location normally occupied by an element 11 and thereby actuate the switch 23. It, of course, will be appreciated that the utilization of the switch 23 in an appropriate electrical circuit will produce an output signal in response to its operation for the time duration that the operating arm is located in the "one" store.

It should now be appreciated that the present invention provides an improved and economical mechanical information storage system.

What is claimed is:

1. A mechanical storage system for storing binary coded information comprising a rotatable shaft mounting a rotatable gear having a preselected number of teeth for defining a storage position between a pair of teeth, a permanent magnet mounted in preselected ones of said storage positions and normally mounted therein through its magnetic properties for representing a preselected binary character, magnetic operating means for setting the magnet to another position by longitudinally moving it between its teeth to extend from one side of the gear for representing the other binary character and for resetting it to its normal position, shielding means mounted adjacent the face of said gear between said electromagnetic operating means and said magnets, electro-mechanical sensing means mounted adjacent the periphery of the gear opposite the side the operated magnets extend from to sense the position of the magnets and operate same to provide an electrical indication corresponding thereto for each magnet extending from said side of gear, and means for rotating said shaft.

2. A mechanical storage system as defined in claim 1 wherein said sensing means includes a switching device having an operating arm extending into engagement with the gear for operating the device to one position with each engagement of a magnet and to the other position when it drops between a pair of teeth.

3. A mechanical storage system as defined in claim 2 wherein said setting and resetting means includes individual electromagnetic operating means and including individual shielding means mounted adjacent the faces of said gear between said operating means and said magnets.

References Cited

UNITED STATES PATENTS

| | | | |
|---|---|---|---|
| 2,217,342 | 10/1940 | Ladrach | 209—72 |
| 2,601,154 | 6/1952 | Krueger | 340—173 |
| 2,770,796 | 11/1956 | Böer | 340—174.1 |
| 3,370,278 | 2/1968 | Hendrickx | 340—174 |

TERRELL W. FEARS, Primary Examiner

U.S. Cl. X.R.

209—213; 340—173